(12) United States Patent
Kori et al.

(10) Patent No.: US 9,276,506 B2
(45) Date of Patent: Mar. 1, 2016

(54) FIELD WINDING TYPE SYNCHRONOUS MOTOR

(71) Applicant: Hitachi, Ltd., Tokyo (JP)

(72) Inventors: Daisuke Kori, Tokyo (JP); Motonobu Iizuka, Tokyo (JP); Takayuki Koyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 33 days.

(21) Appl. No.: 14/447,105

(22) Filed: Jul. 30, 2014

(65) Prior Publication Data

US 2015/0035471 A1 Feb. 5, 2015

(30) Foreign Application Priority Data

Jul. 31, 2013 (JP) ................. 2013-158589

(51) Int. Cl.
*H02P 1/46* (2006.01)
*H02P 1/50* (2006.01)
*H02P 3/18* (2006.01)
*H02P 6/00* (2006.01)

(52) U.S. Cl.
CPC . *H02P 1/50* (2013.01); *H02P 6/002* (2013.01); *H02P 2207/05* (2013.01)

(58) Field of Classification Search
CPC ...................................... H02P 6/002
USPC ........................................... 318/718
See application file for complete search history.

(56) References Cited

U.S. PATENT DOCUMENTS

| 3,381,195 | A | * | 4/1968 | Hoffmann | ............ | 318/718 |
| 4,038,589 | A | * | 7/1977 | Heyne et al. | ............ | 318/718 |
| 4,315,202 | A | * | 2/1982 | Dawson et al. | ............ | 318/718 |
| 5,760,556 | A | * | 6/1998 | Hamilton et al. | ............ | 318/438 |

* cited by examiner

*Primary Examiner* — Erick Glass
(74) *Attorney, Agent, or Firm* — Volpe and Koenig, P.C.

(57) ABSTRACT

A field winding type synchronous motor comprises a stator, a rotor with field windings, a brushless exciter, and a rectification circuit rectifying an output of the brushless exciter. A first circuit in parallel with the field windings includes a discharge resistor and a first switching device with a backward diode. The discharge resistor and the first switching device are connected in series. A second switching device is provided in one of the DC lines connecting the first circuit and the rectification circuit. The first switching device is controlled by a potential obtained by resistor dividing of an induced voltage in the field windings and a connection from the potential via a diode to anode adjacent to the rectification circuit on the one of the DC lines with the second switching device thereon. The second switching device is closed in a synchronous speed.

11 Claims, 14 Drawing Sheets

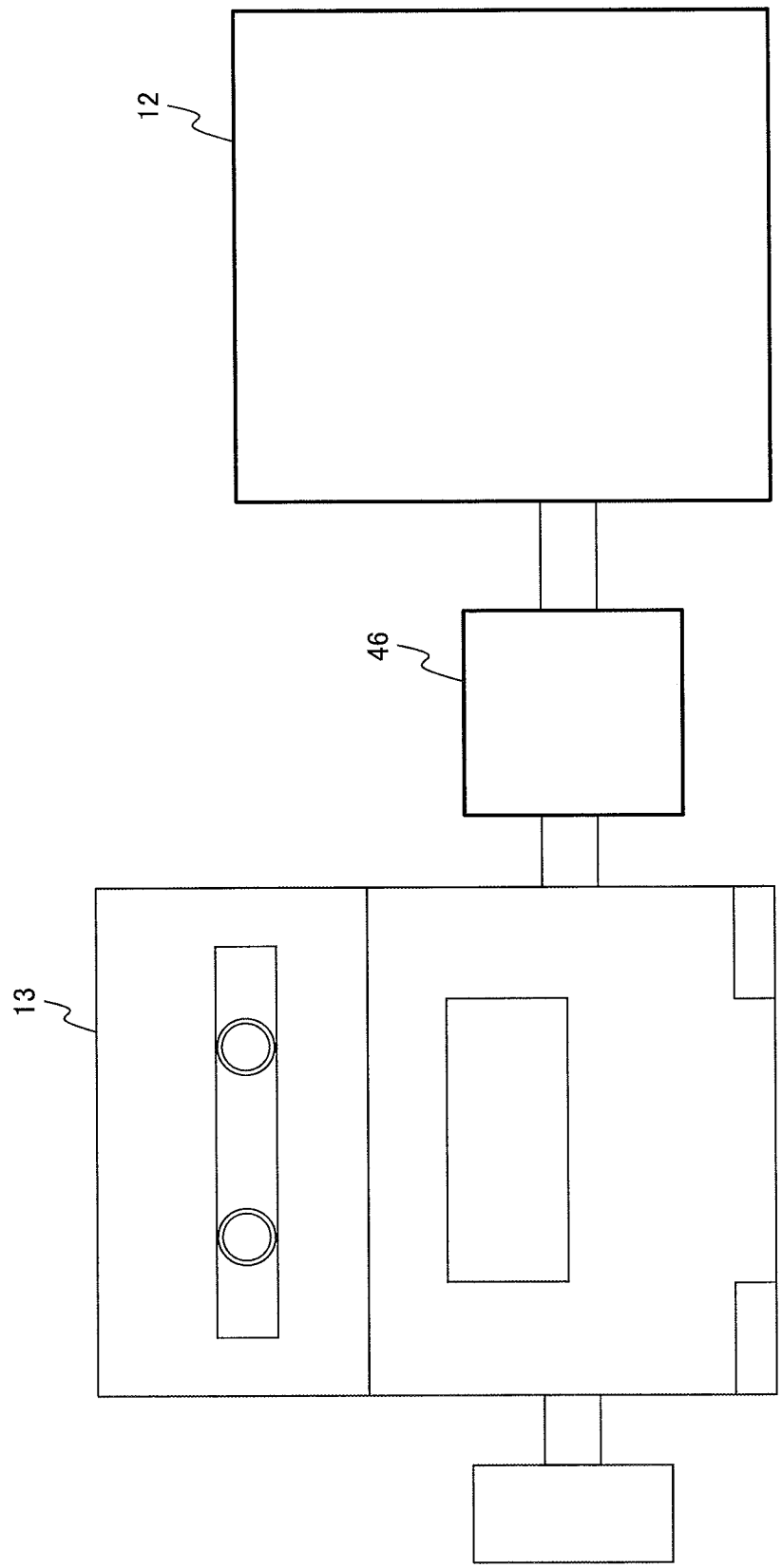

FIELD WINDING TYPE SYNCHRONOUS MOTOR

CLAIM OF PRIORITY

The present application claims priority from Japanese application serial no. 2013-158589, filed on Jul. 31, 2013, the content of which is hereby incorporated by reference into this application.

FIELD OF THE INVENTION

The present invention relates to a field winding type synchronous motor and pertains to a field winding type synchronous motor provided with a field circuit for turning on a field current supplied to field windings when starting up the motor.

BACKGROUND OF THE INVENTION

A field winding type synchronous motor is a synchronous machine and several methods of starting it up are known.

A typical example is a method using an inverter. The method using an inverter makes it easy to start a field winding type synchronous motor, because the motor revolving speed can be adjusted to a variable speed when the motor is started. However, in a case where there is no need for variable speed motor run after the motor is put into synchronization with an electric power system, the inverter would be used only when the motor is started and, thus, the initial cost for the inverter and its installation or the like would become an excessive burden.

As a method of starting up such motor without using an inverter, there is a direct online startup method (DOL startup). DOL startup is a startup method similar to full voltage startup of an induction motor. Despite the synchronous motor, DOL startup starts up such motor by taking advantage of the characteristics of an induction motor only when starting up it. In the field winding type synchronous motor, usually, rotor's field windings are excited by a DC current sourced from an AC brushless exciter. DOL startup makes the field windings disconnected from the AC brushless exciter and puts the field windings in a short-circuited state when the motor is started, in order to gain the characteristics of an induction motor. Besides, a discharge resistor DR is connected to a short-circuited circuit in order to reduce a startup current.

However, the discharge resistor DR is a device that is needed only when the motor is started and, inversely, comes to create a loss when the motor is running steadily at a synchronous speed, which results in a decrease in the efficiency of the motor. For this reason, the discharge resistor DR has to be disconnected when the motor is running steadily. Besides, to put the motor into synchronous run, it is needed to take steps for switching to a DC current sourced from the AC brushless exciter when the motor has accelerated nearly to asynchronous speed after it is DOL started.

In the circumstances as above, with regard to circuitry for switching from startup to synchronous run of the field winding type synchronous motor, various circuitry arrangements are under study; for example, those are known that are described in Japanese Published Unexamined Patent Application No. Sho 59-222087, Japanese Published Unexamined Patent Application No. Hei 06-343250, and Japanese Published Unexamined Patent Application No. Hei 03-078478.

Among them, in a circuitry arrangement as described in Japanese Published Unexamined Patent Application No. Sho 59-222087, a connection from an AC brushless exciter and a rectification circuit to field windings is made via a thyristor. A discharge resistor DR is disposed in parallel with the field windings. In this circuitry arrangement, the thyristor and a gate circuit serve as a circuit for switching the motor to synchronous run.

In a circuitry arrangement as described in Japanese Published Unexamined Patent Application No. Hei 06-343250, a circuit presented in FIG. 6 attached to this document is the circuit that serves to disconnect a discharge resistor DR and switch the motor to synchronous run. In this circuit, the discharge resistor DR is disconnected by a thyristor 24A. Motor startup with the field windings being short-circuited generates an induced current. The thyristor 24A and a diode 24B are provided to conduct this induced current to the discharge resistor DR. Upon switching of the motor to synchronous run, a DC current flows. But, because the thyristor 24A is turned off and the diode 24B is placed in an orientation to block the DC current, the discharge resistor DR is put in a disconnected state. In this circuitry arrangement, a circuit for switching the motor to synchronous run is a thyristor 2a.

A circuitry arrangement as described in Japanese Published Unexamined Patent Application No. Hei 03-078478 is characterized by being provided with a device for positively detecting that the motor has switched to synchronous run.

In the case of the circuitry arrangement as described in Japanese Published Unexamined Patent Application No. Sho 59-222087, there is no circuit for disconnecting the discharge resistor DR. By turn-off of the thyristor, a DC current is conducted to the field windings and, at the same time, this current is also conducted to the discharge resistor DR. Consequently, as noted previously, even in the synchronous run state of the motor in which a DC current is conducted, the current continues to flow to the discharge resistor DR, thus creating a loss and resulting in a decrease in the efficiency of the motor.

In the case of the circuitry arrangement as described in Japanese Published Unexamined Patent Application No. Hei 06-343250, disconnecting the discharge resistor DR and switching the motor to synchronous run are performed by a gate control circuit 23 for the thyristors. Four thyristors exist in this circuitry arrangement. Accordingly, the gate control circuit 23 needs to have as many signal transmitting ports as the thyristors and the size of the gate control circuit 23 becomes larger. When this circuit is placed in a rotor, it would occupy a large mounting area. Besides, for the thyristor 24A for disconnecting the discharge resistor DR, there is a possibility that a signal is input to its gate because of noise or malfunction of the gate control circuit 23 to turn the thyristor on, thus conducting a current to the discharge resistor DR during synchronous run of the motor.

In the case of the circuitry arrangement as described in Japanese Published Unexamined Patent Application No. Hei 03-078478, because a discharge resistor DR does not exist in this circuitry arrangement, it is anticipated that, during the DOL startup of the motor, a current increases, causing a large disturbance to the system.

By the inventions disclosed in Japanese Published Unexamined Patent Application Nos. Sho 59-222087, Hei 06-343250, and Hei 03-078478, it is considered too difficult to reduce a startup current and positively disconnect the discharge resistor DR after the motor is put into synchronous run.

The present invention is intended to provide a field winding type synchronous motor having a discharge resistor DR included in a field circuit, provided with circuitry capable of switching the motor to synchronous run and disconnecting the discharge resistor DR, reducing the possibility that the discharge resistor DR is reconnected because of disturbance or the like after the motor is put into synchronous run, and allowing for downsizing of the circuitry.

SUMMARY OF THE INVENTION

One aspect of the present invention resides in a field winding type synchronous motor including a stator which is connected to an electric power system, a rotor with field windings wound on a shaft, a brushless AC exciter mounted on the shaft, and a rectification circuit which rectifies an output of the brushless AC exciter and gives a DC current to DC lines, the field windings being connected to the DC lines. A first circuit is connected in parallel with the field windings, the first circuit including a discharge resistor and a parallel circuit formed of a diode and a first switching device. The discharge resistor and the parallel circuit are connected in series. A second switching device is provided in series to one of the DC lines connecting the first circuit and the rectification circuit. The first switching device is controlled to be open or closed by a potential obtained by dividing an induced voltage induced in the field windings by a resistor. And a connection is made from a node of a voltage divided potential via a diode to a node, which is adjacent to the rectification circuit, on the one of the DC lines with the second switching device connected thereon. The second switching device is closed when the synchronous motor has accelerated nearly to a synchronous speed.

According to the present invention, it becomes possible to reduce a startup current, reduce the possibility that the discharge resistor is reconnected after the motor is put into synchronous run, and downsize control circuitry for disconnecting the discharge resistor.

BRIEF DESCRIPTION OF THE DRAWINGS

FIG. 15 is a diagram depicting an example of an external view of a field winding type synchronous motor.

DETAILED DESCRIPTION OF THE PREFERRED EMBODIMENTS

Figure 1:
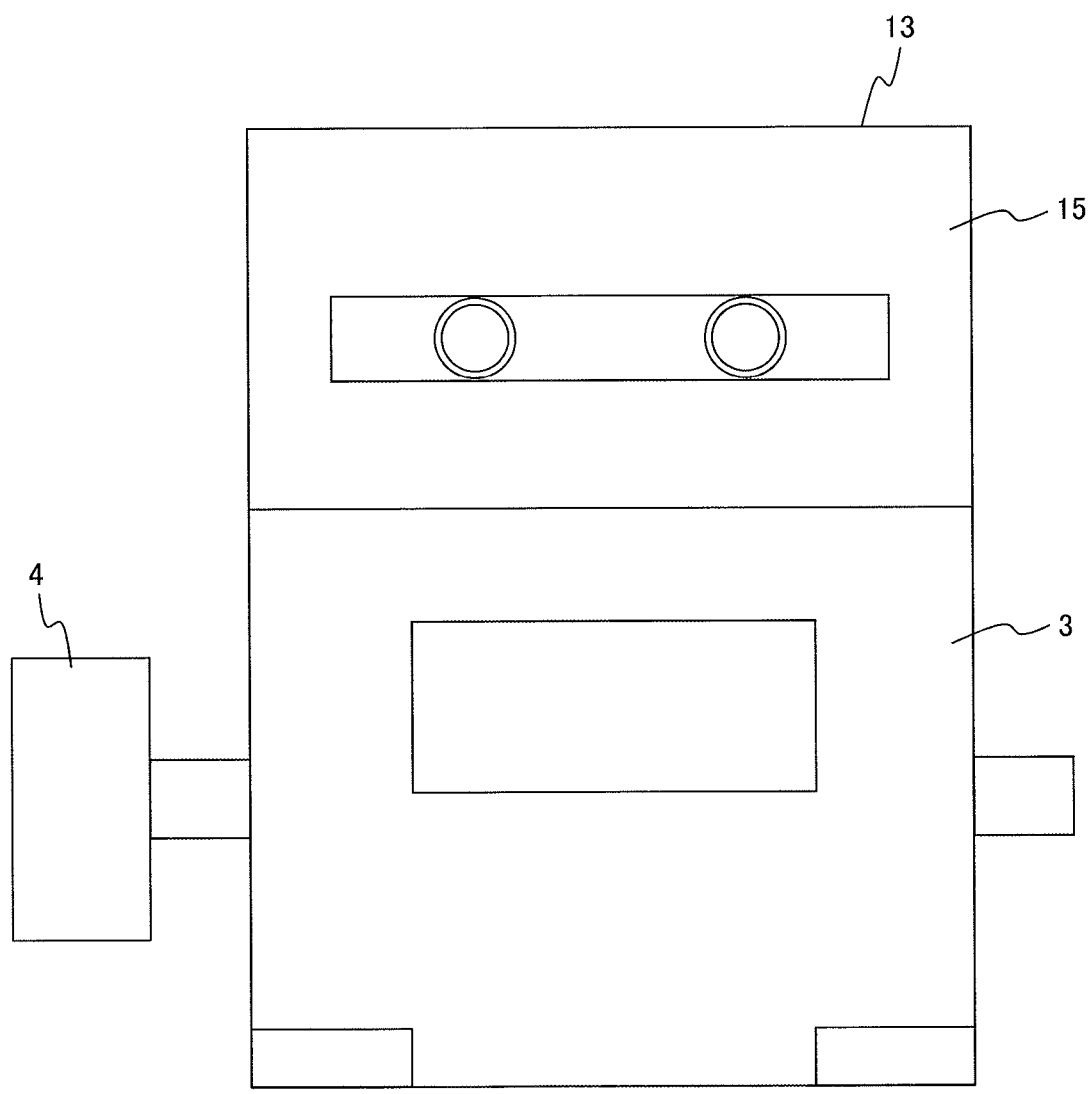
FIG. 1 is a diagram depicting an example of an external view of a field winding type synchronous motor.

In the following, embodiments of the present invention are described with the aid of the drawings. In the drawings, corresponding parts are assigned the same reference numbers.

First Embodiment

Figure 2:
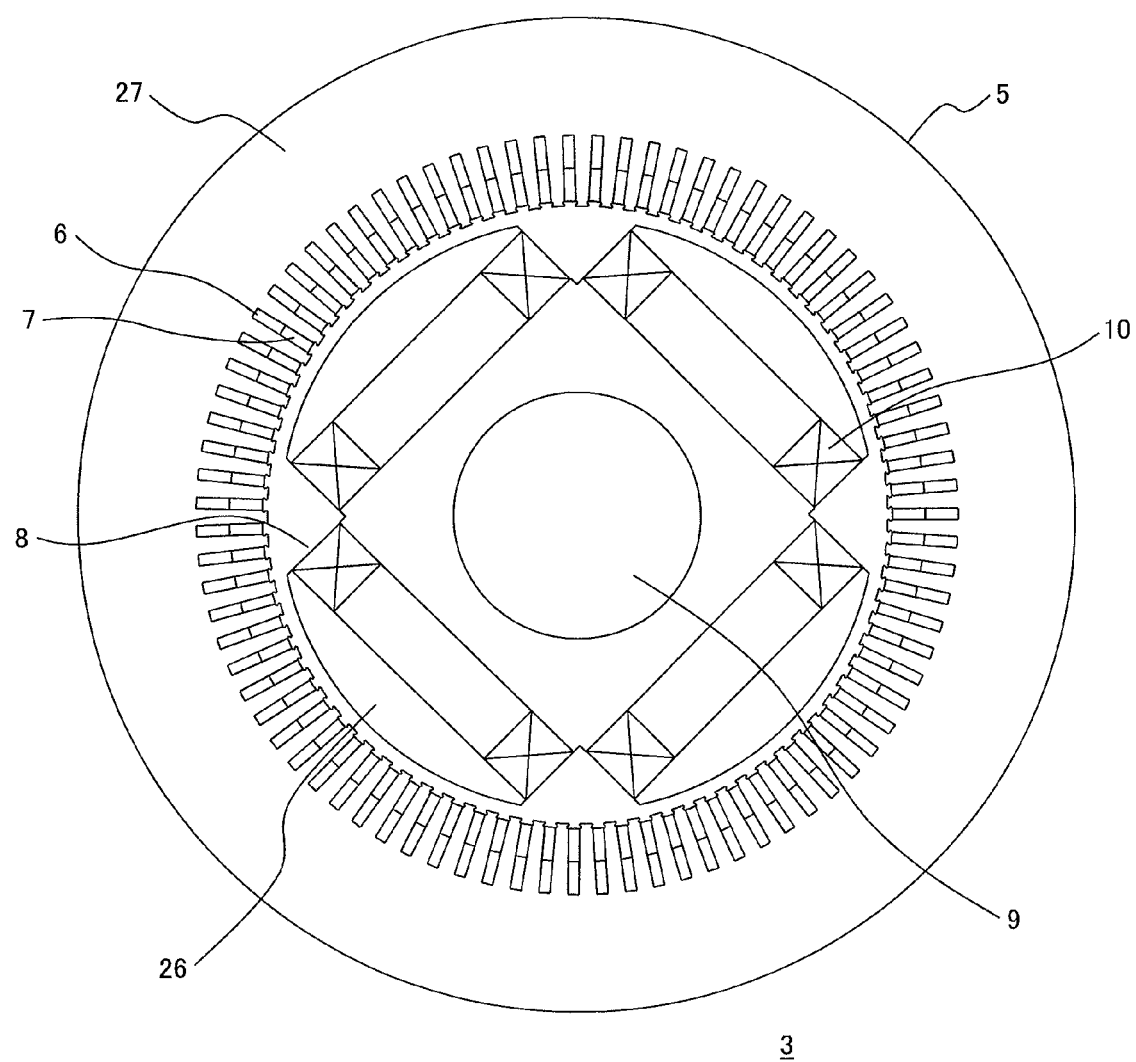
FIG. 2 is a diagram depicting an example of a concrete internal structure of a rotary unit in FIG. 1.
Figure 3:
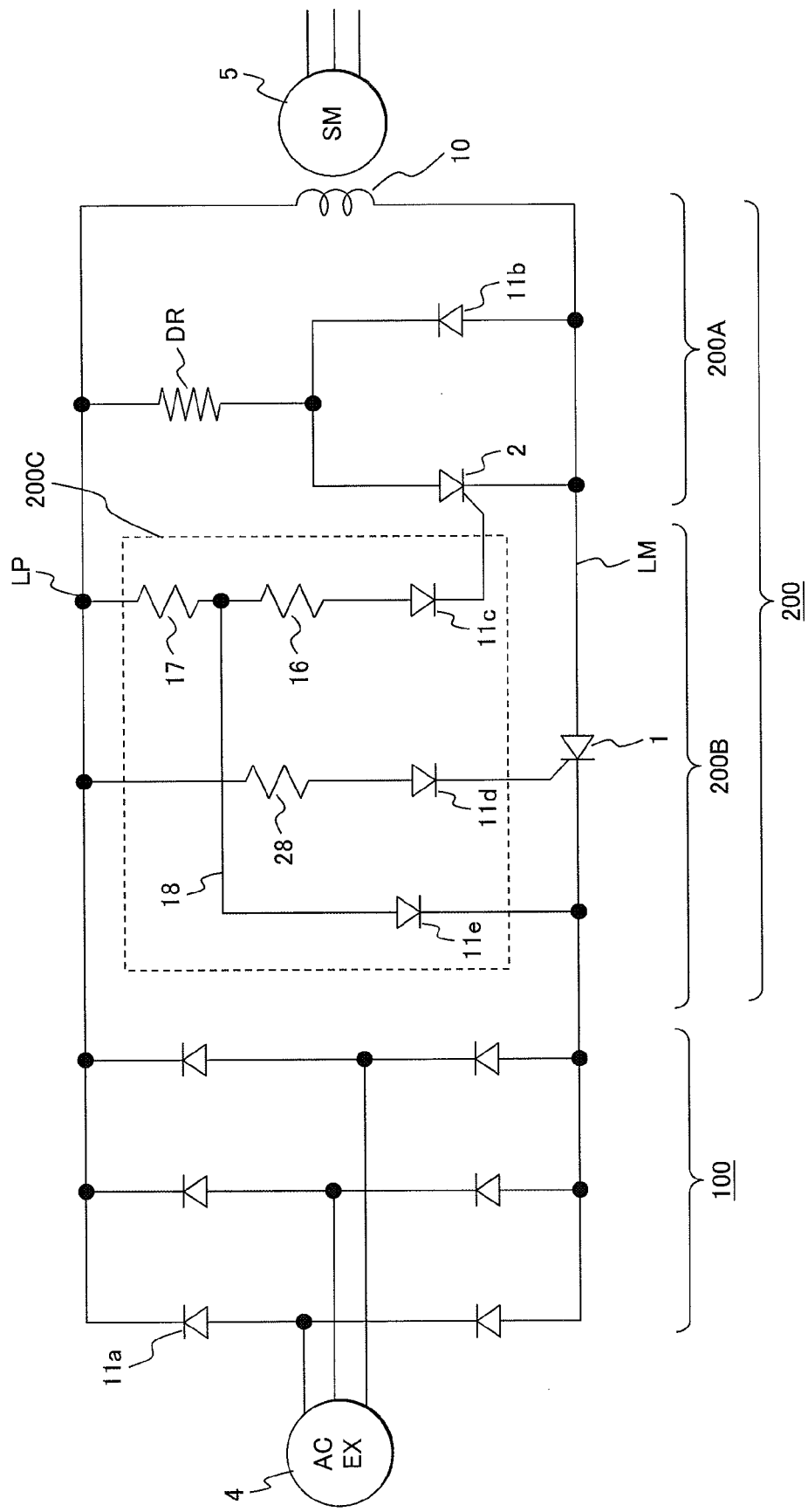
FIG. 3 is a diagram depicting a configuration of a field circuit of the field winding type synchronous motor pertaining to the first embodiment.

A first embodiment is described with FIGS. 1, 2, and 3.

FIG. 1 is a diagram depicting an example of an external view of a general field winding type synchronous motor. A field winding type synchronous motor 13 which is regarded as applicable herein is a motor having a large capacity on the order of several tens of MWs, which is applied in, e.g., LNG plants or the like. The motor is supplied with three-phase AC power as driving powers source and rotates at a revolving speed in a range of 750 to 1500 revolutions per minute. As depicted in FIG. 1, the field winding type synchronous motor 13 is roughly comprised of main constituent elements (constituent devices); i.e., a rotary unit 3, a heat exchanger 15, and a brushless AC exciter 4.

FIG. 2 depicts an example of a concrete internal structure of the rotary unit 3 in FIG. 1. A rotor 8, a stator 5, and a shaft 9 are placed inside the rotary unit 3. There is also provided a fan, which is not depicted, for circulating cooling air inside the rotary unit 3. The rotor 8 is comprised of a rotor core 26, the shaft 9, and field windings 10. The field windings 10 having alternately opposite winding directions are arranged so that polarity changes alternately in a circumferential direction. The rotor core 26 is a massive iron core, not a magnetic steel plate, to obtain a damper effect. Thereby, it becomes possible to increase starting torque.

The stator 5 has a stator core 27 made of magnetic steels laminated in an axial direction and coils 7 are embedded into stator slots 6. Although, in FIG. 2, the rotor has four rotor poles and the stator has 84 stator slots, the rotor may have poles in any other number and the stator may have slots in any other number. The way in which the coils 7 are wound may be distributed winding or concentrated winding.

Returning to FIG. 1, the brushless AC exciter 4 which is another main constituent element is a device for conducting a DC current to and exciting the field windings 10 of the rotor 8. The heat exchanger 15 is a device for making heat exchange of cooling air inside the rotary unit 3; the heat exchanger in the first embodiment uses water, but it may use air.

Depicted in FIG. 3 is a configuration example of a field circuit of the field winding type synchronous motor pertaining to the first embodiment. The field circuit of the field winding type synchronous motor in FIG. 3 is configured for supplying a DC current from the brushless AC exciter 4 to the rotor windings (field windings) 10 of the rotor 8. This circuit is comprised of a rectification circuit section 100 and a synchronization turn-on circuit section 200. The rectification circuit section 100 is configured with a six-phase Graetz bridge comprised of diodes 11a, converts an AC current from the brushless AC exciter 4 to a DC current, and supplies the DC current to the rotor windings (field windings) 10 of the rotor 8. In the drawing, L denotes power supply lines, LP denotes a positive potential line, and LM denotes a negative potential line. Note that positive/negative here is based on polarity that is determined by the rectification circuit section 100.

The synchronization turn-on circuit section 200 is further comprised of a discharge resistor section 200A, a synchronization turn-on section 200B, and a condition detecting section 200C. The discharge resistor section 200A is comprised of a discharge resistor DR, a backward diode 11b, and a thyristor 2. The synchronization turn-on section 200B is configured with a thyristor 1. The condition detecting section 200C, in essence, discriminates between a startup state and a synchronous run state of the motor and controls conduction (turn-on) and non-conduction (turn-off) of the thyristors 1 and 2 according to the detected state.

Using FIG. 3, operation of the field circuit of the field winding type synchronous motor is described. In this circuit, the rectification circuit section 100, which is configured as described already, gives an output that makes the positive potential line LP have a positive potential and the negative potential line LM have a negative potential.

In the discharge resistor section 200A, the discharge resistor DR and a parallel circuit formed of the backward diode 11b and the thyristor 2 are connected in series between the positive potential line LP and the negative potential line LM. This circuit forms a path that allows flowing of an AC induced current induced in the field windings 10, as will be described later. When the AC induced current flows through the positive potential line LP, a current path from the discharge resistor DR via the thyristor 2 to the negative potential line LM is formed. When the AC induced current flows through the negative potential line LM, a current path from the backward diode 11b via the discharge resistor DR to the positive potential line LP is formed. Therefore, conduction (turn-on) of the thyristor 2 is controlled when the AC induced current flows through the negative potential line LM.

In the synchronization turn-on section 200B, the thyristor 1 is disposed in series to the negative potential line LM. Thereby, when the thyristor 1 is turned off, it makes a separation between a circuit portion (rectification circuit section 100) adjacent to the brushless AC exciter 4 and a circuit portion (discharge resistor section 200A) adjacent to the field windings 10. When the thyristor 1 is turned on, it makes coupling between the circuit portion (rectification circuit section 100) adjacent to the brushless AC exciter 4 and the circuit portion (discharge resistor section 200A) adjacent to the field windings 10. Besides, the thyristor 1 may be disposed in series to the positive potential line LP.

The condition detecting section 200C controls conduction (turn-on) and non-conduction (turn-off) of the thyristors 1 and 2. For control of the thyristor 1, a series circuit formed of a resistor 28 and a forward diode 11d is connected between the positive potential line LP and the gate of the thyristor 1 connected in series to the negative potential line LM. Therefore, depending on a potential applied to the positive potential line LP, separation or coupling between the rectification circuit section 100 and the discharge resistor section 200A is to be determined.

Also in the condition detecting section 200C, for control of the thyristor 2, a series circuit formed of resistors 17, 16 and a forward diode 11c is connected between the positive potential line LP and the gate of the thyristor 2. Also, a connection is made from a connection node between the resistors 17 and 16 via a forward diode 11e to a node, which is adjacent to the rectification circuit section 100, on the negative potential line LM. Thereby, the thyristor 2 is controlled depending on a potential of the positive potential line LP and forms a current path via the discharge resistor DR.

This circuit, in essence, controls conduction of the thyristor 2 by voltage division of the potential of the power supply line (positive potential line) and drops the potential at the voltage division node to the potential of the negative potential line LM. Consequently, in a state where the rectification circuit section 100 and the circuit portion adjacent to the field windings 10 are separated, the thyristor 2 is controlled by the voltage-divided potential. In a state where the rectification circuit section 100 and the circuit portion adjacent to the field windings 10 are coupled, the potential at the voltage division node is dropped to a negative potential and this can positively inhibit the thyristor 2 from being conductive. In other words, this can disconnect the discharge resistor DR from the field windings.

The operation of the circuit in FIG. 3 is described below in time series sequence. First, when the motor is DOL started, the brushless AC exciter 4 does not give a sufficient output and the potential of the positive potential line LP in the rectification circuit section 100 does not rise. Thus, the series circuit formed of the resistor 28 and the forward diode 11d gives no signal to the gate of the thyristor 1 and the thyristor 1 is in a turned-off state. Thus, there is a separation between the rectification circuit section 100 and the discharge resistor section 200A and, in this state, the circuit in FIG. 3 appears to be comprised of the field coils 10, discharge resistor DR, thyristor 2, resistors 16, 17, and diode 11b. Accordingly, the circuit appears to be a short-circuited circuit via the discharge resistor DR, thyristor 2, and diode 11b, when viewed from the field coils 10.

During the startup, from this state, by giving a three-phase voltage to the stator 5 (connecting the stator windings to an electric power system via a breaker), an induced current is generated in the field coils 10. A positive current component of the generated AC induced current is applied to the thyristor 2 via the discharge resistor DR; it flows through the resistors 16, 17 and diode 11c to the gate of the thyristor 2. When the current flows into the gate of the thyristor 2, conduction between the anode and cathode of the thyristor 2 turns on. Thereby, a positive induced current flows from the discharge resistor DR via the thyristor 2 to the field coils 10.

On the other hand, a negative current flows from the diode 11b via the discharge resistor DR to the field coils 10. At this time, a negative voltage is applied to the thyristor 2 and its gate current is zero; thus, conduction between the anode and cathode of the thyristor 2 turns off. Through behavior as above, the induced current from the field coils 10, whether it is positive or negative, is constrained by flowing through the discharge resistor DR.

Subsequently, as the motor starts up and accelerates, frequency decreases and, accordingly, the induced current also decreases. Thereby, when the motor accelerates nearly to a synchronous speed, the current flowing into the gate of the thyristor 2 decreases and, thus, conduction between the anode and cathode of the thyristor 2 becomes to remain in a turned-off state. In this way, the induced current flows through the discharge resistor DR until the motor speed has reached nearly a synchronous speed after the startup, whereas only the negative current component of the induced current becomes to flow through the discharge resistor DR, once the motor speed has reached nearly a synchronous speed.

Here, the reason why the thyristor 2 and the diode 11b are connected in series to the discharge resistor DR is as follows.

Because a field current to be supplied to field windings is a DC current, if the thyristor 2 is put in a turned-off state, a reverse current flows through the diode 11b and acts to block the DC current. Thereby, the DC current is prevented from flowing to the discharge resistor DR and the discharge resistor DR can be disconnected after the supply of the field current is turned on. By provision of the discharge resistor DR, it becomes possible to reduce a startup current when the motor is started.

Next, a description is provided for an operation of turning on the supply of the field current when the motor has accelerated to a synchronous speed. First, the principle of the AC exciter 4 is described. This principle is the same as for an AC excitation type synchronous motor. By allowing an excitation current to flow to the stator, a current is generated in the rotor. Thereby, a current can be supplied to the field coils 10 without using brushes. Thus, the generated current will increase, as the motor accelerates. In this way, a three-phase current flows from the AC exciter 4 and is converted to a DC current in the rectification circuit section 100 in which six diodes 11a are arranged.

In the state when the motor has accelerated nearly to a synchronous speed, the DC current flows via the resistor 28 and diode 11d to the gate of the thyristor 1. When the current follows into the gate of the thyristor 1, conduction between its anode and cathode turns on. This makes coupling between the rectification circuit section 100 and the discharge resistor section 200A and the DC current flows to the field coils 10.

In this state, the thyristor 2 is made to remain in the turn-off state. That is, the values of the resistors 16, 17 are set so that conduction between the anode and cathode of the thyristor 2 will be turned on, if an induced voltage is larger than a field voltage, as a turn-on condition. Thus, the thyristor 2 can remain in the turned-off state even after the supply of the field current is turned on.

Also in this state, by the diode 11e provided on a bypass circuit 18 diverging from a connection node between the resistors 16 and 17, the following function is fulfilled. When an induced voltage is generated during startup, no current flows through the diode 11e, because the thyristor 1 turns off. When the thyristor 1 turns on, a current flows through the bypass circuit 18 and the diode 11e. Thus, by disconnecting the rectification circuit comprised of the diodes 11a, taking advantage of characteristics of the motor when it is started, the gate circuit portion of the thyristor 1 is put in a non-potential state and the thyristor 1 is prevented from being turned on by the induced voltage during startup.

Moreover, since, by turn-on of the thyristor 1, the gate circuit of the thyristor 2 is connected via the bypass circuit 18 and the diode 11e to the cathode of the thyristor 1, the bypass circuit 18 and the diode 11e make it possible to positively turn the thyristor 2 off and avoid that the motor is put into synchronous run, while the discharge resistor DR is conducting a current.

Even for a suddenly occurring signal such as noise, it becomes possible to keep the thyristor 2 turned off and disconnect the discharge resistor DR.

Because the circuit depicted in FIG. 3 except for the stator 5 is to be mounted on the shaft 9 of the rotor 8, the circuit is to rotate with the motor when the motor is driven. Although the thyristors 1, 2 are semiconductor elements in the first embodiment, they may be mechanical switching devices. In the latter case, even in a configuration in which the circuit portion that is mounted on the shaft 9 is removed from the shaft 9 and located in a separate place and brushes are mounted, the same advantageous effects as described above can be obtained.

Second Embodiment

Figure 4:
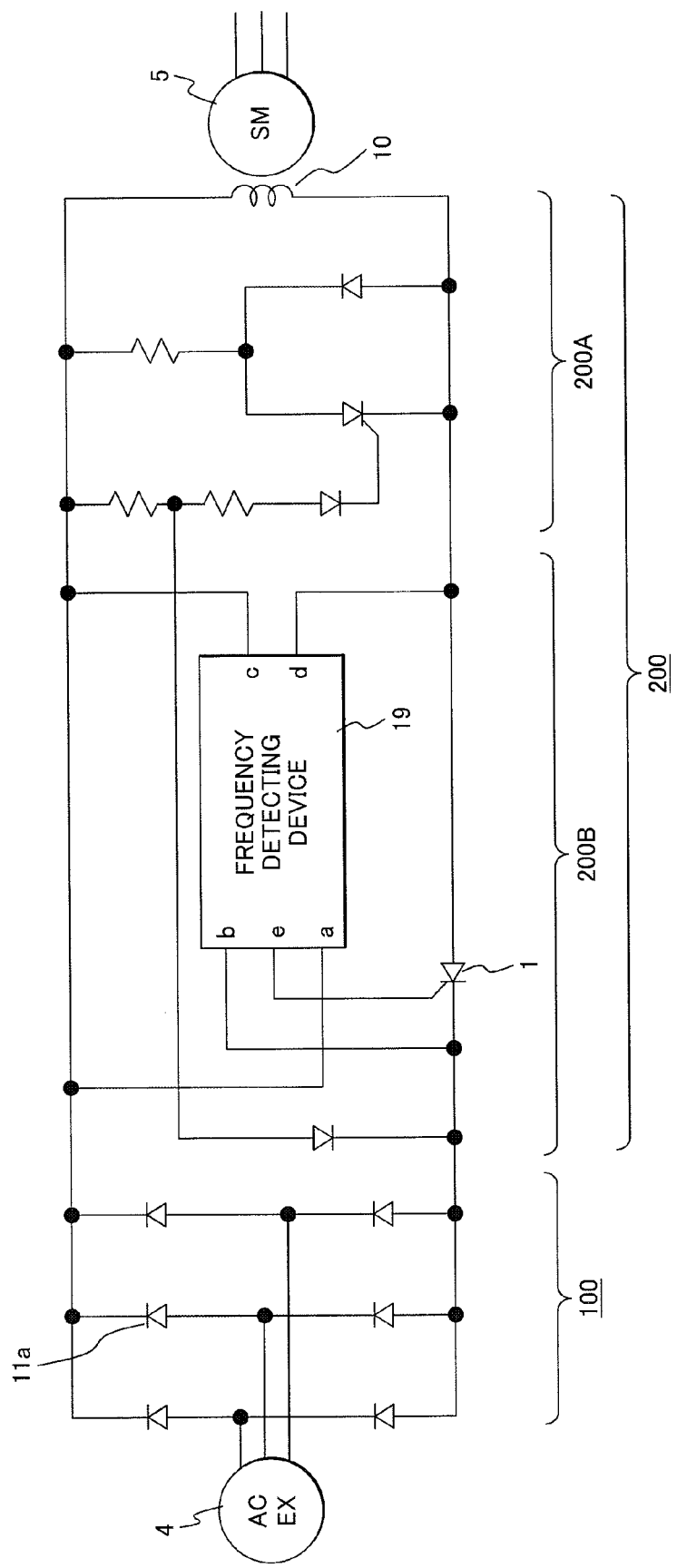
FIG. 4 is a diagram depicting a configuration of a field circuit of a field winding type synchronous motor pertaining to a second embodiment.
Figure 5:
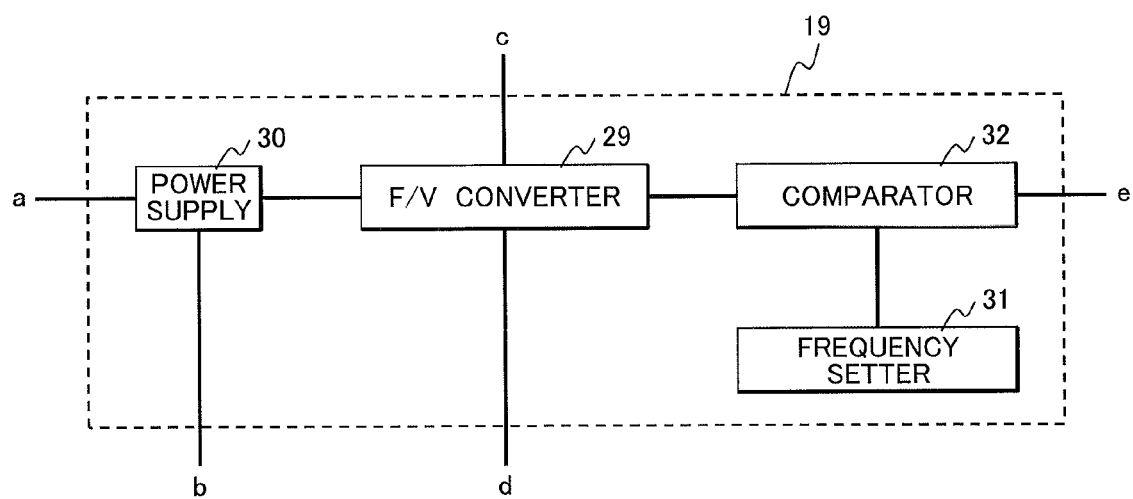
FIG. 5 is a diagram depicting a concrete structure of a frequency detecting device in the field circuit pertaining to the second embodiment.
Figure 12:
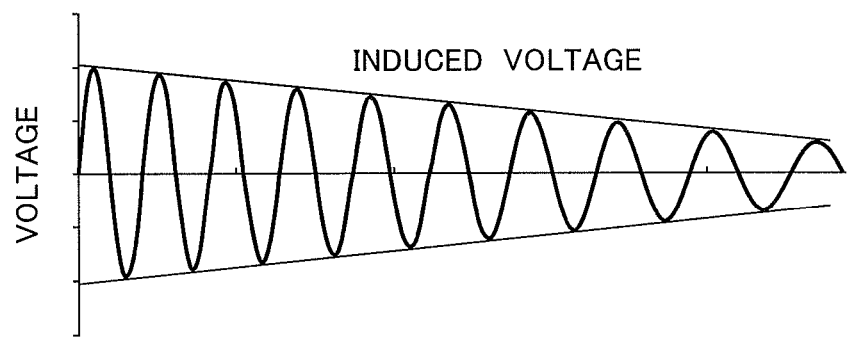
FIG. 12 is a diagram depicting an induced voltage changing over time.

A second embodiment is described with FIGS. 4, 5, and 12.

FIG. 4 depicts a configuration example of a field circuit of a field winding type synchronous motor pertaining to the second embodiment. In the second embodiment, the field circuit equipped with a frequency detecting device for controlling the thyristor 1 is depicted in the circuit diagram. The frequency detecting device monitors a slip frequency as a condition for switching the thyristor 1.

In the circuit configuration in FIG. 4, the series circuit portion formed of the resistor 28 and the forward diode 11d for controlling the gate of the thyristor 1 in the circuitry of the condition detecting section 200C in FIG. 2 is replaced by the frequency detecting device 19. Therefore, a method of controlling the gate of the thyristor 1 only differs from that in the first embodiment and the following description focuses on this point.

For control of the thyristor, attention is directed to a slip frequency. FIG. 12 is a diagram depicting an induced voltage waveform over time during DOL startup. An AC voltage induced in the rotor windings 10 by turning on power supply to the windings of the stator 5 decreases over time after time t0 and the period of the AC voltage cycle becomes longer over time. The frequency of the AC voltage is a so-called slip frequency. As a characteristic of such an induced voltage during startup, because the induced voltage frequency at a low revolving speed largely differs from the frequency of a power supply voltage conducted to the stator 5, the induced voltage generated in the field coils 10 is large and its frequency is high. This frequency is called a slip frequency and both the induced voltage and the slip frequency decrease, as the revolving speed of the motor increases. Exploiting this relationship, the frequency detecting device 19 presented in the second embodiment, when the induced voltage frequency has become to be a certain frequency (slip frequency) that has been set, transmits a signal to the gate of the thyristor 1, so that the supply of a field current can be turned on.

As depicted in FIG. 4, the frequency detecting device 19 has input terminals c, d (receiving the respective potentials of the positive potential line LP and the negative potential line LM), terminals a, b for power supply to the device (receiving the respective potentials of the positive potential line LP and the negative potential line LM adjacent to the rectification circuit section 100), and an output terminal e (transmitting a signal to the gate of the thyristor 1).

Depicted in FIG. 5 is an internal structure of the frequency detecting device 19. As depicted in FIG. 5, in the frequency detecting device 19, a frequency/voltage converter 29 converts a frequency to a voltage. The power source for driving the frequency/voltage converter 29 is provided from a power supply 30. To the power supply 30, a DC current produced via the diodes 11a, sourced from the brushless AC exciter 4, is input. The frequency of the induced voltage and a frequency that has been set by a frequency setter 31 are compared by a comparator 32. Once a match has been occurred between both frequencies, a signal is transmitted to the thyristor 1.

Depending on the load condition during startup, the motor acceleration condition varies and the slip frequency changes accordingly. According to the second embodiment, a slip frequency suitable for exciting the field windings is set, taking the load condition into account, and the supply of a field current is turned on when the induced voltage frequency has become equal to the set slip frequency. Thereby, a stable starting characteristic can be obtained.

Third Embodiment

Figure 6:
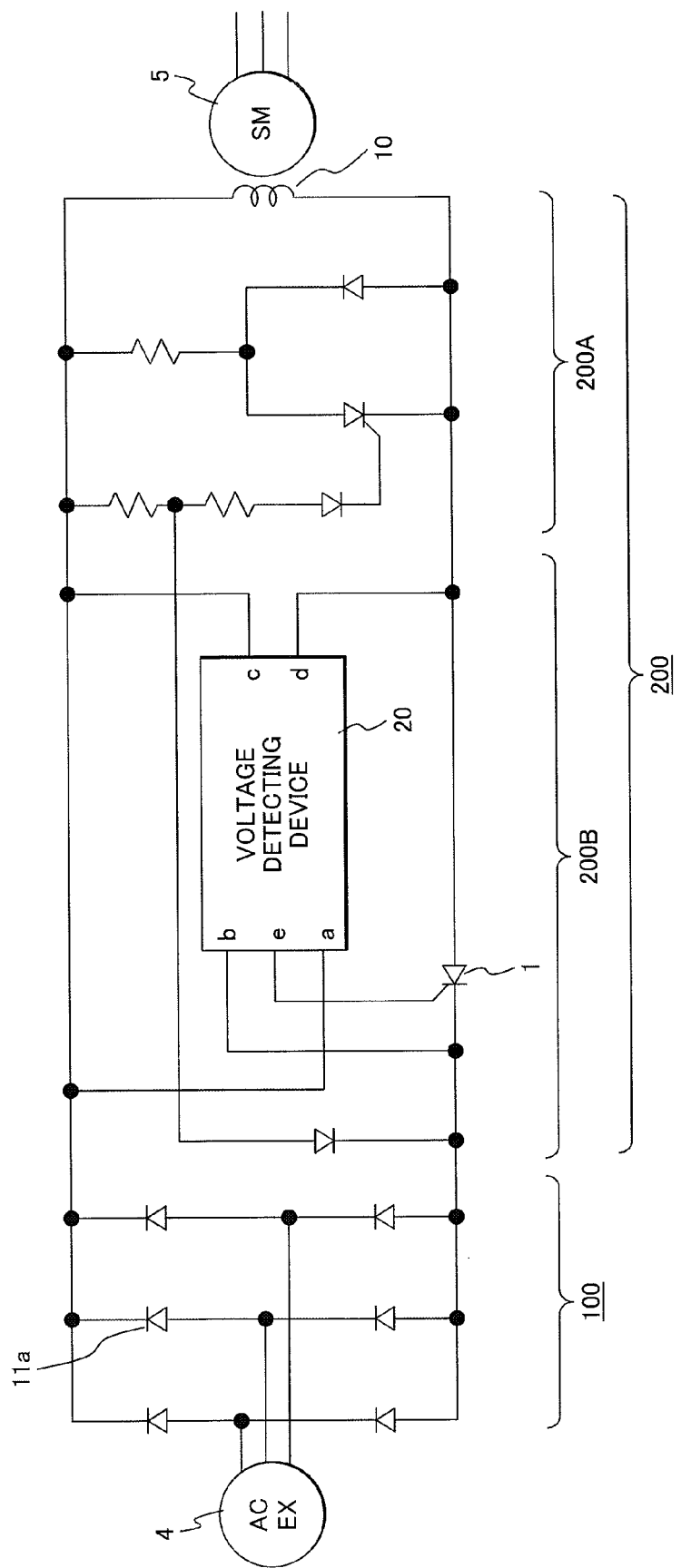
FIG. 6 is a diagram depicting a configuration of a field circuit of a field winding type synchronous motor pertaining to a third embodiment.
Figure 7:
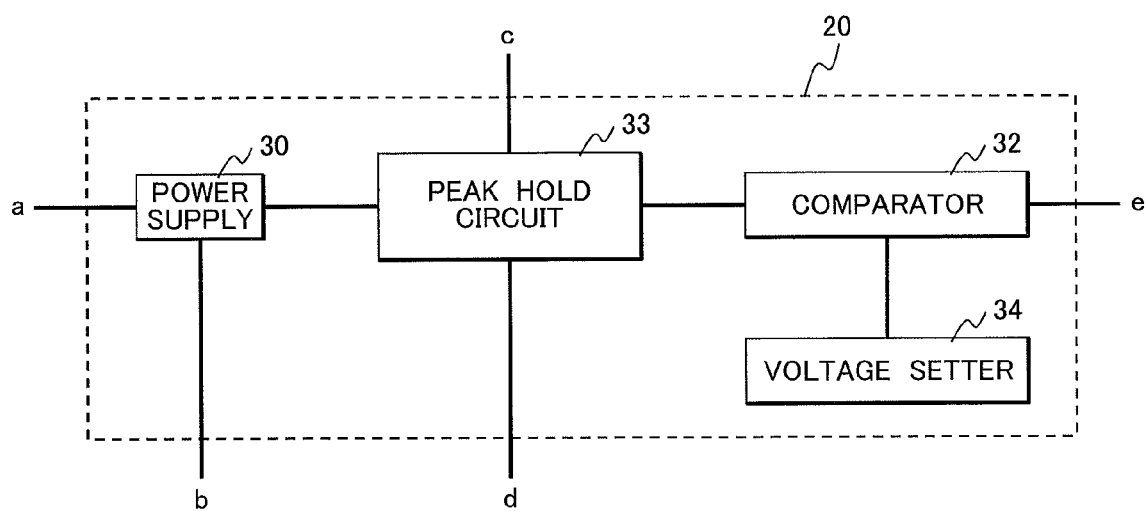
FIG. 7 is a diagram depicting a concrete structure of a voltage detecting device in the field circuit pertaining to the third embodiment.

A third embodiment is described with FIGS. 6 and 7.

FIG. 6 depicts a configuration example of a field circuit of a field winding type synchronous motor pertaining to the third embodiment. In the third embodiment, the field circuit equipped with a voltage detecting device 20 instead of the frequency detecting device 19 in the second embodiment is depicted in the circuit diagram. The voltage detecting device 20 monitors an induced voltage as a condition for switching the thyristor 1.

As descried with FIG. 12 in the foregoing context of the second embodiment, the magnitude of the induced voltage changes depending on the revolving speed. Thus, as depicted in FIG. 6, the magnitude of the induced voltage is detected by the voltage detecting device 20 and, when the induced voltage has become to be a certain voltage that has been set, the voltage detecting device 20 transmits a signal to the gate of the thyristor 1, so that the supply of a field current can be turned on.

As depicted in FIG. 6, the voltage detecting device 20 has input terminals c, d (receiving the respective potentials of the positive potential line LP and the negative potential line LM), terminals a, b for power supply to the device (receiving the respective potentials of the positive potential line LP and the negative potential line LM), and an output terminal e (transmitting a signal to the gate of the thyristor 1).

Depicted in FIG. 7 is an internal structure of the voltage detecting device 20. As depicted in FIG. 7, in the voltage detecting device 20, a peak hold circuit 33 detects a maximum value of the induced voltage which has been input. The power source for driving the peak hold circuit 33 is provided from a power supply 30. To the power supply 30, a DC current produced via the diodes 11a, sourced from the AC exciter 4, is input. The detected voltage value of the induced voltage and a voltage that has been set by a voltage setter 34 are compared by the comparator 32. Once a match has been occurred between both voltages, a signal is transmitted to the thyristor 1.

Depending on the load condition during startup, the motor acceleration condition varies and the induced voltage changes accordingly. According to the third embodiment, a voltage suitable for exciting the field windings is set, taking the load condition into account, and the supply of a field current is turned on when the induced voltage has become equal to the set voltage. Thereby, a stable starting characteristic can be obtained.

Fourth Embodiment

Figure 8:
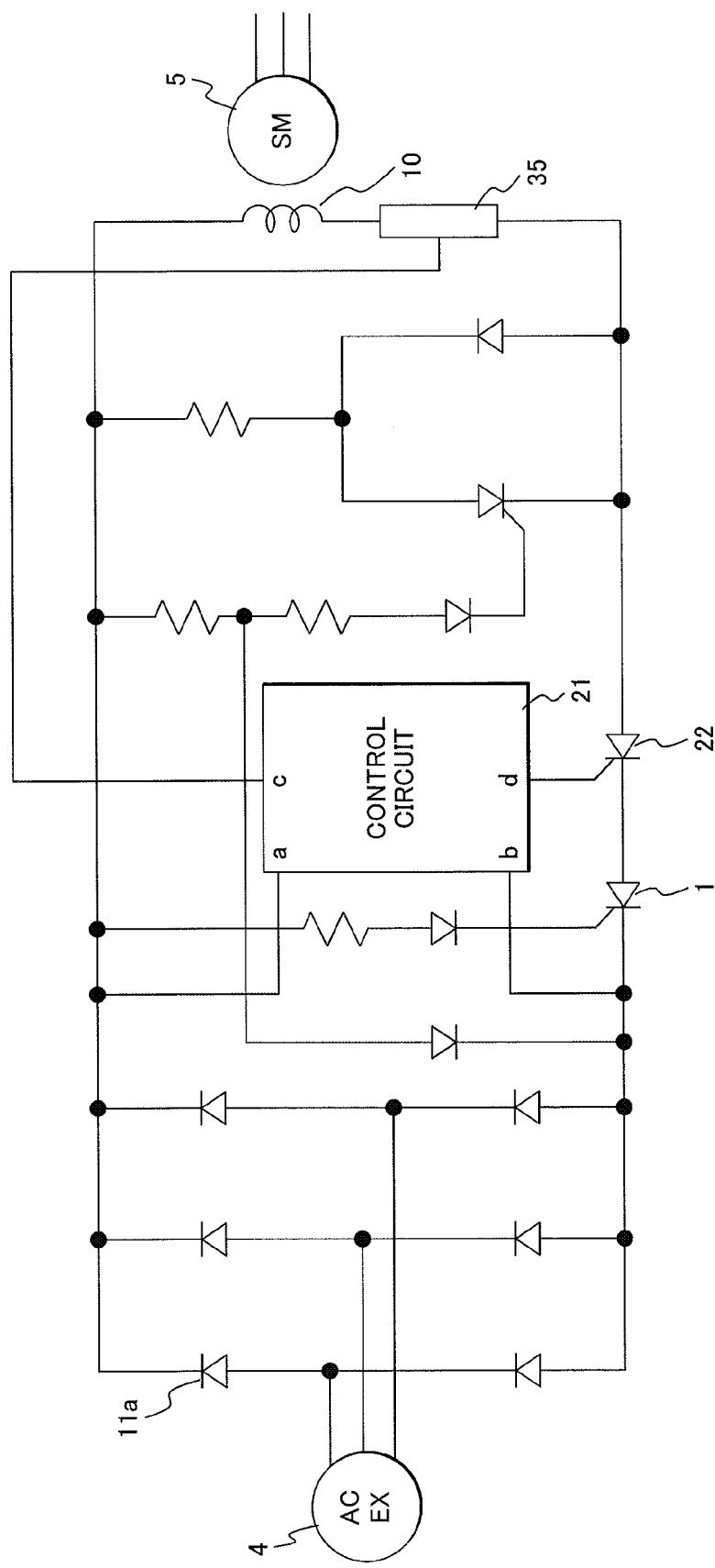
FIG. 8 is a diagram depicting a configuration of a field circuit of a field winding type synchronous motor pertaining to a fourth embodiment.
Figure 9:
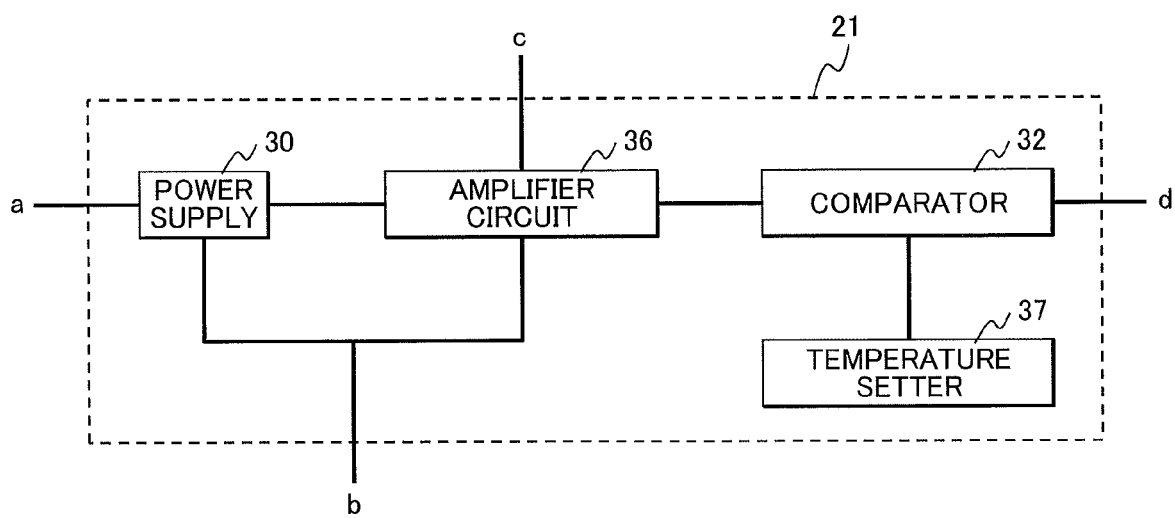
FIG. 9 is a diagram depicting a concrete structure of a control circuit in the field circuit pertaining to the fourth embodiment.

A fourth embodiment is described with FIGS. 8 and 9.

Depicted in FIG. 8 is a configuration example of a field circuit of a field winding type synchronous motor pertaining to the fourth embodiment. In the fourth embodiment, a control circuit 21 and a thyristor 22 controlled by the control circuit 21 are additionally installed in the configuration of the field circuit of the first embodiment described with FIG. 3.

Here, the thyristor 22 is installed in series to the thyristor 1 installed on the negative potential line LM. The control circuit 21 acts to turn off the thyristor 22 when a temperature signal from a temperature sensor 35 attached to the field coils 10 has become equal to or more than a set temperature.

Thus, a function that makes a separation between a circuit portion (rectification circuit section 100) adjacent to the brushless AC exciter 4 and a circuit portion (discharge resistor section 200A) adjacent to the field windings 10 is to be performed by turn-off of one of two thyristors 1 and 22. On the other hand, a function that makes coupling between the circuit portion (rectification circuit section 100) adjacent to the brushless AC exciter 4 and the circuit portion (discharge resistor section 200A) adjacent to the field windings 10 is to be performed by turn-on of both the two thyristors installed on the negative potential line LM.

As depicted in FIG. 8, a temperature signal from the temperature sensor 35 attached to the field coils 10 is detected by the control circuit 21 and, when the thus detected temperature has become to be a set temperature, the control circuit transmits a signal to the gate of the thyristor 22, so that the supply of a field current can be turned on.

As depicted in FIG. 8, the control circuit 21 has an input terminal c (receiving a temperature signal from the temperature sensor 35 attached to the field coils 10), terminals a, b for power supply to the device (receiving the respective potentials of the positive potential line LP and the negative potential line LM), and an output terminal d (transmitting a signal to the gate of the thyristor 22).

Depicted in FIG. 9 is a concrete internal structure of the control circuit 21. As depicted in FIG. 9, in the control circuit 21, an amplifier circuit 36 detects and amplifies a temperature signal which has been input from the terminal C. The power source for driving the amplifier circuit 36 is provided from a power supply 30. To the power supply 30, a DC current produced via the diodes 11a, sourced from the AC exciter 4, is input. The detected temperature signal and a set temperature that has been set by a temperature setter 37 are compared by the comparator 32. Once a match has been occurred between both temperatures, a signal is transmitted to the thyristor 22.

According to the fourth embodiment, in a case when the temperature of the field coils 10 has become to be an upper limit value of temperature of the coils, which is applicable, the thyristor 22 is turned off and the motor is to return from the synchronous run state to the DOL state. When the motor has returned to the DOL state, if the slip frequency is low, the induced current will be smaller than the field current; thus, overheat of the field coils 10 can be avoided. On the other hand, when the motor has returned to the DOL state, if the slip frequency is high, the revolving speed of the motor itself will decrease; thus it can be detected that the motor itself is in an abnormal condition.

As the thyristor 22, a GTO thyristor is applied which can be switched on/off by changing the polarity of a signal to be transmitted to its gate. Besides, the same function as this thyristor can be obtained even with a mechanical switching device.

The control circuit 21 and the thyristor 22 controlled by the control circuit 21 in the fourth embodiment are, in essence, constituent elements for temperature protection of the field windings 10. Therefore, although these elements for temperature protection are, here, additionally installed in the field circuit configuration of FIG. 1, they can also be applied to other field circuit configurations of the second embodiment, the third embodiment, and further embodiments.

Fifth Embodiment

Figure 10:
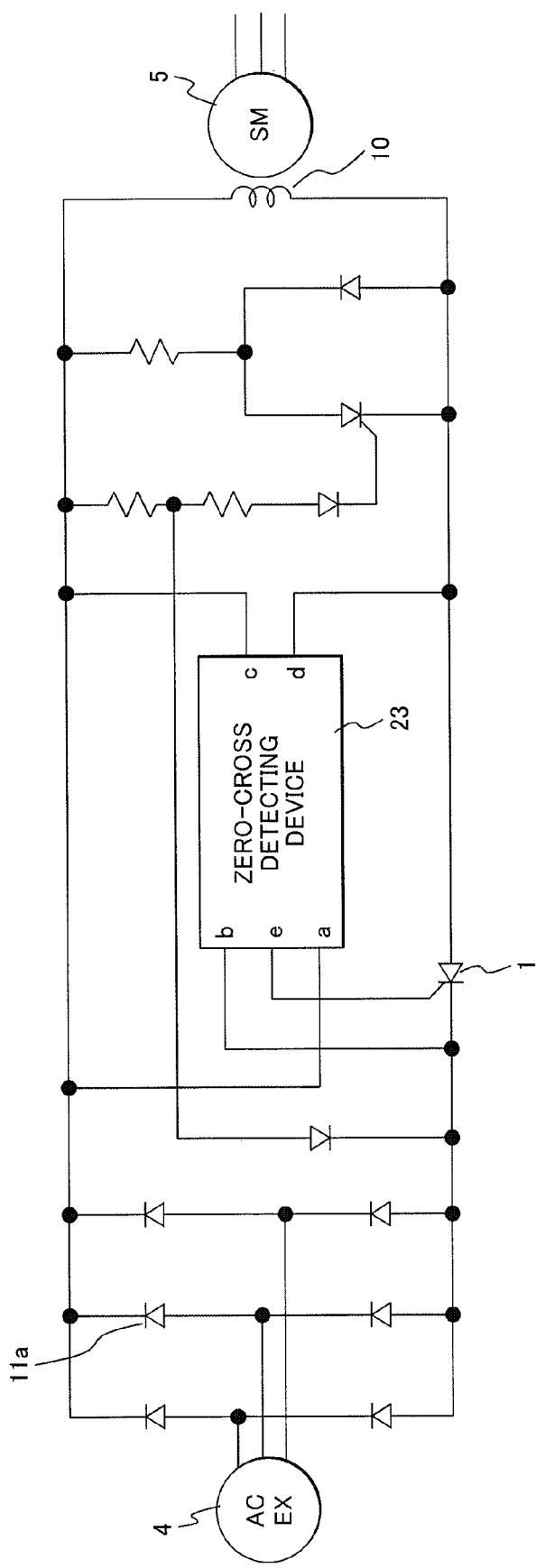
FIG. 10 is a diagram depicting a configuration of a field circuit of a field winding type synchronous motor pertaining to a fifth embodiment.
Figure 11:
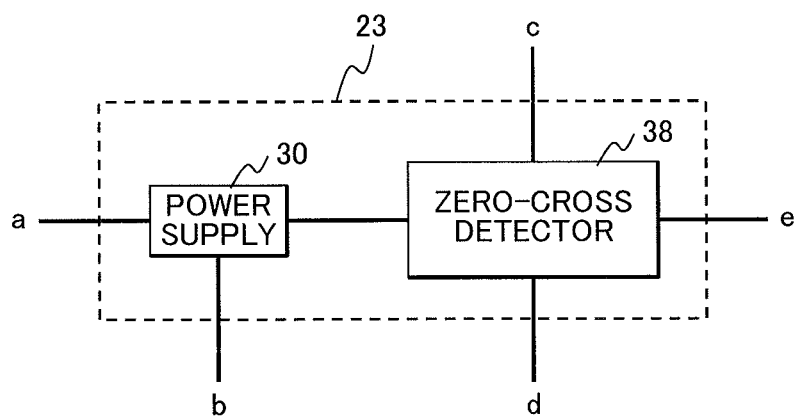
FIG. 11 is a diagram depicting a concrete structure of a zero-cross detecting device in the field circuit pertaining to the fifth embodiment.

A fifth embodiment is described with FIGS. 10 and 11.

Depicted in FIG. 10 is a configuration example of a field circuit of a field winding type synchronous motor pertaining to the fifth embodiment. In the fifth embodiment, the field circuit equipped with a zero-cross detecting device 23 instead of the frequency detecting device 19 in the second embodiment and the voltage detecting device 20 in the third embodiment is depicted in the circuit diagram. The zero-cross detecting device 23 detects a zero crossing point of an induced voltage and, at a point of time when a zero crossing has occurred, transmits a signal to the gate of the thyristor 1, so that the supply of a field current can be turned on.

Timing to make a connection between the rectification circuit and the field windings by turn-on of the thyristor 1 is here set to a point of time when a zero crossing has occurred. This is due to the following reason. The rotor starts up as an inductor upon startup and becomes to run as a synchronous machine by turn-on of the thyristor 1. During this process, the rotor alternates between a motor run mode and a generating operation mode. Thus, if turn-on timing is wrong, there is a fear that the connection is made in an unstable operation condition of the motor even in synchronous run. Thus, a point of stable operation that begins at a time when a zero crossing has occurred is aimed.

As depicted in FIG. 10, the zero-cross detecting device 23 has input terminals c, d (receiving the respective potentials of the positive potential line LP and the negative potential line LM), terminals a, b for power supply to the device (receiving the respective potentials of the positive potential line LP and the negative potential line LM), and an output terminal e (transmitting a signal to the gate of the thyristor 1).

Depicted in FIG. 11 is a concrete internal structure of the zero-cross detecting device 23. As depicted in FIG. 11, in the zero-cross detecting device 23, a zero-cross detector circuit 38 detects a zero crossing of an induced voltage which has been input. The power source for driving the zero-cross detector circuit 38 is a power supply 30. To the power supply 30, a DC current produced via the diodes 11a, sourced from the AC exciter 4, is input. According to this embodiment, it is possible turn on the supply of a field current always at the same timing phase. Thus, the same starting characteristic can be obtained every time the field windings are excited.

Depicted in FIG. 12 is an induced voltage 24 changing over time, described in the foregoing context of the first embodiment and the second embodiment. This is a sine-wave signal whose amplitude changes over time. As depicted in FIG. 12, the amplitude of the induced voltage is large and its frequency is high just after startup and, the amplitude decreases and the frequency lowers, as the revolving speed of the motor increase.

Sixth Embodiment

Figure 13:
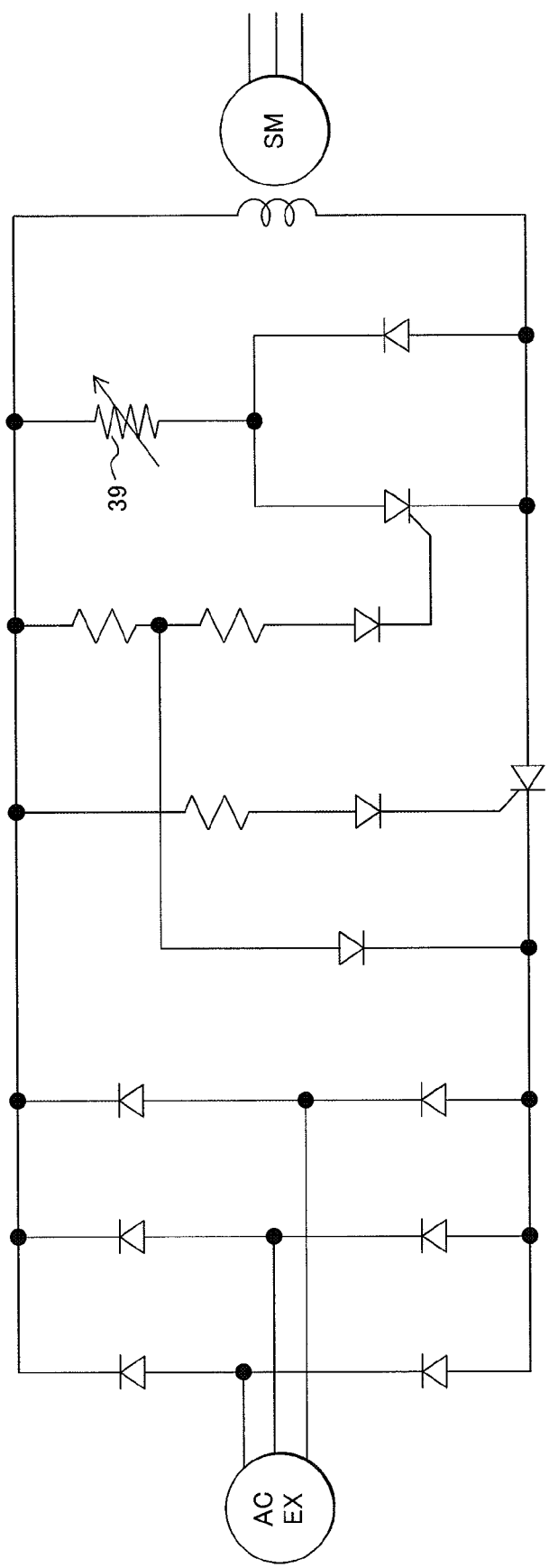
FIG. 13 is a diagram depicting a configuration of a field circuit of a field winding type synchronous motor pertaining to a sixth embodiment.

A sixth embodiment is described with FIG. 13.

FIG. 13 is a diagram depicting a configuration of a field circuit of a field winding type synchronous motor pertaining to the sixth embodiment. Presented here is an instance in which a variable resistor is used as the discharge resistor DR. By using the variable resistor 39 as the discharge resistor DR, the resistance of the discharge resistor DR can be set to an optimal resistance value, even if intrinsic characteristics (output and frequency) of the motor changed. Optimizing the resistance value of the discharge resistor DR leads to minimizing the startup current.

Seventh Embodiment

Figure 14:
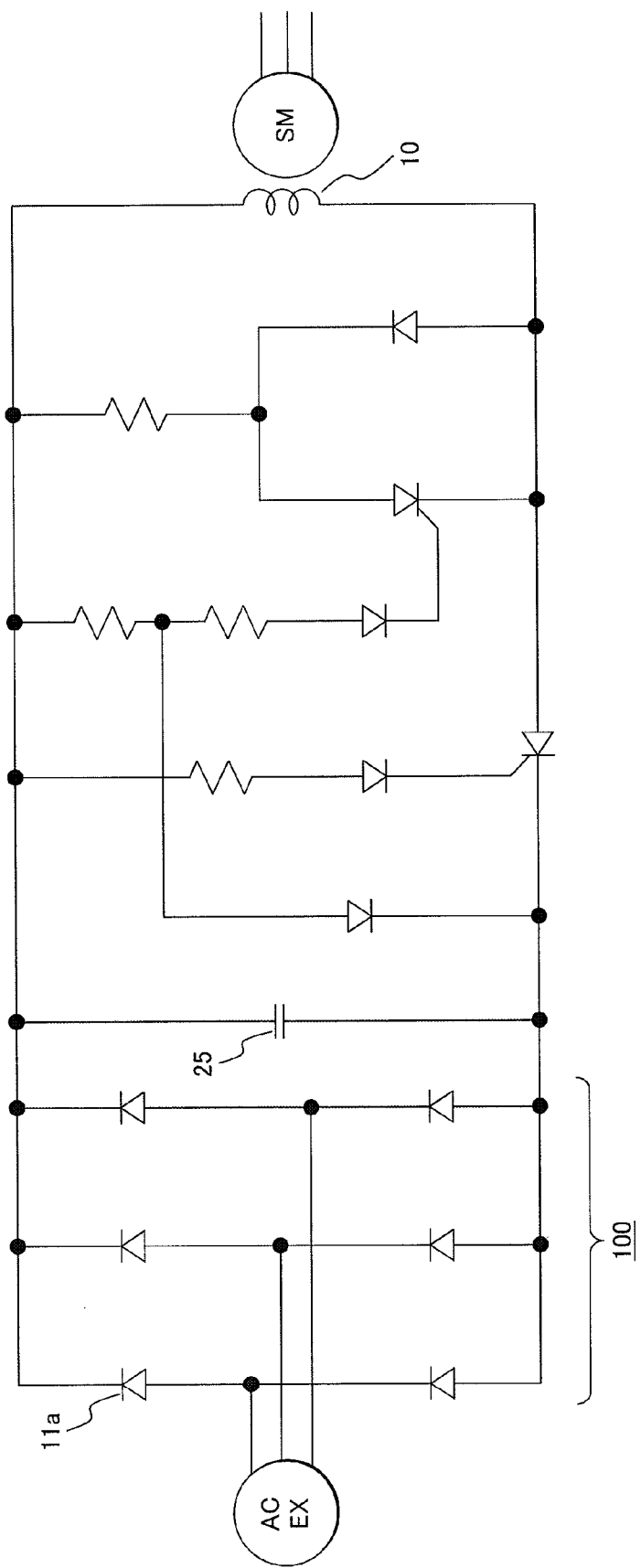
FIG. 14 is a diagram depicting a configuration of a field circuit of a field winding type synchronous motor pertaining to a seventh embodiment.

A seventh embodiment is described with FIG. 14.

FIG. 14 is a diagram depicting a configuration of a field circuit of a field winding type synchronous motor pertaining to the seventh embodiment. Here, a smoothing capacitor is disposed between the positive potential line LP and the negative potential line LM. The smoothing capacitor 25 is disposed next to and in parallel with the rectification circuit section 100 comprised of the diodes 11a. A current rectified in the rectification circuit section 100 includes a ripple component. By installing the smoothing capacitor 25, it is possible to remove the ripple component and supply a ripple-less field current to the field coils 10. By doing so, it is possible to eliminate torque pulsation and a vibrational component of the motor due to ripples.

Eighth Embodiment

An eighth embodiment is described with FIG. 15.

FIG. 15 is a diagram depicting an example of an external view of a field winding type synchronous motor. Presented here is an instance in which the motor is liked to a compressor as a motor load. A field winding type synchronous motor 13 having a circuit, any one of those presented in the first through seventh embodiments described above, a step-up gear 46, and a compressor 12 are linked together. According to this embodiment, it becomes possible to install and operate the motor linked to the compressor in a plant where a compressor is needed, such as LNG, chemical agent, and chemical plants.

In the foregoing embodiments described, an instance is presented in which coupling and separation between the circuit portions are performed by a thyristor. However, this component can generally be configured with a switching device and, obviously, the thyristor can be replaced by a semiconductor element of any suitable kind.

What is claimed is:

1. A field winding type synchronous motor comprising a stator which is connected to an electric power system, a rotor with field windings wound on a shaft, a brushless AC exciter mounted on the shaft, and a rectification circuit which rectifies an output of the brushless AC exciter and gives a DC current to DC lines, the field windings being connected to the DC lines, wherein a first circuit is connected in parallel with the field windings, the first circuit including a discharge resistor and a parallel circuit formed of a diode and a first switching device, wherein the discharge resistor and the parallel circuit are connected in series, and a second switching device is provided in series to one of the DC lines connecting the first circuit and the rectification circuit, wherein the first switching device is controlled to be open or closed by a potential obtained by dividing an induced voltage induced in the field windings by a resistor and a connection is made from a node of a voltage divided potential via a diode to a node, which is adjacent to the rectification circuit, on the one of the DC lines with the second switching device connected thereon, and wherein the second switching device is closed when the synchronous motor has accelerated nearly to a synchronous speed.

2. The field winding type synchronous motor according to claim 1, wherein the first circuit is connected in parallel with the field windings, the stator is connected to the electric power system with the second switching device being open, and the second switching device is closed when the synchronous motor has accelerated nearly to a synchronous speed.

3. The field winding type synchronous motor according to claim 1, wherein the first switching device is turned open or closed depending on polarity of an induced current induced in the field windings by connecting the stator to the electric power system.

4. The field winding type synchronous motor according to claim 2,
wherein detection is made that the synchronous motor has accelerated nearly to a synchronous speed by a slip frequency.

5. The field winding type synchronous motor according to claim 2,
wherein detection is made that the synchronous motor has accelerated nearly to a synchronous speed by an induced voltage induced in the field windings by connecting the stator to the electric power system.

6. The field winding type synchronous motor according to claim 2,
wherein detection is made that the synchronous motor has accelerated nearly to a synchronous speed by a zero-cross point of a slip frequency.

7. The field winding type synchronous motor according to claim 1,
wherein a third switching device is connected in series to the second switching device and is controlled to be open or closed depending on temperature of the field windings.

8. The field winding type synchronous motor according to claim 1,
wherein each of the switching devices is configured with a semiconductor element.

9. The field winding type synchronous motor according to claim 2,
wherein the first switching device is turned open or closed depending on polarity of an induced current induced in the field windings by connecting the stator to the electric power system.

10. The field winding type synchronous motor according to claim 2,
wherein a third switching device is connected in series to the second switching device and is controlled to be open or closed depending on temperature of the field windings.

11. The field winding type synchronous motor according to claim 2,
wherein each of the switching devices is configured with a semiconductor element.

* * * * *